(12) United States Patent
Yagi

(10) Patent No.: US 10,234,682 B2
(45) Date of Patent: Mar. 19, 2019

(54) HEAD-UP DISPLAY DEVICE AND BACKLIGHT DEVICE

(71) Applicant: Yazaki Corporation, Tokyo (JP)

(72) Inventor: Kenji Yagi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 12 days.

(21) Appl. No.: 14/941,907

(22) Filed: Nov. 16, 2015

(65) Prior Publication Data

US 2016/0139408 A1    May 19, 2016

(30) Foreign Application Priority Data

Nov. 17, 2014 (JP) ................................. 2014-232337

(51) Int. Cl.
  *G02B 27/01* (2006.01)
(52) U.S. Cl.
  CPC ..... *G02B 27/0101* (2013.01); *G02B 27/0149* (2013.01); *G02B 2027/0118* (2013.01)
(58) Field of Classification Search
  CPC ............ G02B 27/0101; G02B 27/0149; G02B 2027/0136; G02B 2027/0141; G02B 2027/0154
  (Continued)

(56) References Cited

U.S. PATENT DOCUMENTS 5,212,471 A * 5/1993 McDonald ......... G02B 27/0018
                                                                    345/7

2009/0091934 A1 * 4/2009 Lin ........................... F21K 9/00
                                                                    362/294
2011/0317273 A1 * 12/2011 Kasai ..................... B60K 35/00
                                                                    359/630
(Continued)

FOREIGN PATENT DOCUMENTS

JP    H 11-119151 A    4/1999
JP    2001356404 A    12/2001
(Continued)

OTHER PUBLICATIONS

Office Action dated Oct. 31, 2016, issued by the Japanese Intellectual Property Office in counterpart Japanese Application No. 2014-232337, Machine Translation.

(Continued)

*Primary Examiner* — Stephone B Allen
*Assistant Examiner* — Travis S Fissel
(74) *Attorney, Agent, or Firm* — Sughrue Mion, PLLC

(57) ABSTRACT

A head-up display device includes: a light source that emits light; a condenser that condenses the light emitted from the light source in a first direction; an adjuster that adjusts the light emitted from the condenser; a first reflector that reflects the light emitted from the adjuster in a second direction different from the first direction; a display that includes an image display surface forming a display image and emits a display light representing the display image with the image display surface transmitting the light reflected by the first reflector; a second reflector that reflects the display light being emitted from the display and being incident from above; and a third reflector that reflects the display light incident from the second reflector to the projection member. The adjuster adjusts the light emitted from the condenser according to a size of the image display surface.

14 Claims, 7 Drawing Sheets

(58) Field of Classification Search
USPC .......................... 359/620–631, 633, 638–640
See application file for complete search history.

(56) References Cited

U.S. PATENT DOCUMENTS

| | | | |
|---|---|---|---|
| 2012/0188514 A1 | 7/2012 | Lin | |
| 2012/0250306 A1* | 10/2012 | Sugiyama | B60K 35/00 362/231 |
| 2012/0293774 A1* | 11/2012 | Inoue | G02B 13/04 353/31 |
| 2013/0063754 A1* | 3/2013 | Saisho | G02B 26/0858 358/1.13 |
| 2014/0022645 A1* | 1/2014 | Matsuura | G02B 27/0101 359/626 |
| 2015/0219984 A1* | 8/2015 | Matsubara | G02B 26/008 353/31 |

FOREIGN PATENT DOCUMENTS

| | | | |
|---|---|---|---|
| JP | 2005283817 A | 10/2005 | |
| JP | 200841256 A | 2/2008 | |
| JP | 2008-268485 A | 11/2008 | |
| JP | 2012162028 * | 7/2012 | ......... G02B 27/0101 |
| JP | 2012155310 A | 8/2012 | |
| JP | 2012-203176 A | 10/2012 | |
| JP | 201459432 A | 4/2014 | |
| JP | 2014170112 A | 9/2014 | |

OTHER PUBLICATIONS

Office Action dated Mar. 21, 2017, issued by the Japanese Intellectual Property Office in counterpart Japanese Application No. 2014-232337.

* cited by examiner

HEAD-UP DISPLAY DEVICE AND BACKLIGHT DEVICE

CROSS REFERENCE TO RELATED APPLICATION

This application is based on Japanese Patent Application (No. 2014-232337) filed on Nov. 17, 2014, the contents of which are incorporated herein by reference. Also, all the references cited herein are incorporated as a whole.

BACKGROUND OF THE INVENTION

1. Technical Field

One or more embodiments of the present invention relate to a head-up display device and a backlight device.

2. Background Art

In the related art, as a display device mounted on a vehicle, a head-up display device (hereinafter, referred to as "HUD device") is known (for example, see Patent Documents 1 and 2). The HUD device includes a backlight device and more than one reflecting mirror. The backlight device emits a display light representing a display image. The reflecting mirror reflects the display light more than once toward a windshield and projects the display light onto the windshield that is a projection member. The display light projected to the windshield is reflected by the windshield to an eye point of an occupant. Thus, the occupant visually recognizes a virtual image corresponding to the display image on the outside of the windshield. The HUD device is accommodated within an instrument panel in front of the vehicle and the occupant that is mainly a driver can visually recognize the virtual image on the outside of the windshield so as to overlap a forward scenery.

Patent Document 1 is JP-A-2012-203176. Patent Document 2 is JP-A-2008-268485.

SUMMARY OF THE INVENTION

However, since the HUD device is disposed within the instrument panel, the HUD device has to be accommodated within a limited space and certain restrictions are imposed on a size thereof. The HUD device includes a light source, a display panel for forming the display image, and a backlight device having an optical system disposed between the light source and the display panel. In the HUD device, since an optical path from the light source to the display panel is configured linearly, a size of the structure may be large, the HUD device may interfere with the instrument panel or other vehicle components, and a vehicle type on which the HUD device can be mounted may be limited.

The embodiments of the invention are made in view of the above circumstances and an object thereof is to provide a head-up display device and a backlight device which are intended to realize the reduction in size of the device.

In order to solve such problems, one or more embodiments of a first invention provide a head-up display device in which display light representing a display image is projected to a projection member so that the display image is visually recognized. The head-up display device includes a light source that emits light; a condenser that condenses the light emitted from the light source in a first direction; an adjuster that adjusts the light emitted from the condenser; a first reflector that reflects the light emitted from the adjuster in a second direction different from the first direction; a display that includes an image display surface forming the display image and emits the display light with the image display surface transmitting the light reflected by the first reflector; a second reflector that reflects the display light being emitted from the display and being incident from above; and a third reflector that reflects the display light incident from the second reflector to the projection member. Here, the adjuster adjusts the light emitted from the condenser according to a size of the image display surface.

Here, in the embodiments of the first invention, it is preferable that the adjuster uniformizes the intensity distribution of the light incident on the image display surface.

Furthermore, in the embodiments of the first invention, it is preferable that the adjuster is configured of two or more optical elements and one of the optical elements configuring the adjuster is also used as the first reflector.

Furthermore, it is preferable that the embodiments of the first invention further include a printed substrate on which the light source is mounted, a heat radiating member that thermally contacts the printed substrate, and a housing which is disposed on the printed substrate so as to cover the light source, and in which the display is assembled. Here, it is preferable that the printed substrate and the heat radiating member extend in the emission direction of the display light and are accommodated below the second reflector.

Furthermore, one or more embodiments of a second invention provide a backlight device including a light source that emits light; a condenser that condenses the light emitted from the light source in a first direction; an adjuster that adjusts the light emitted from the condenser; a first reflector that reflects the light emitted from the adjuster in a second direction different from the first direction; and a display that includes an image display surface forming a display image and emits display light representing the display image with the image display surface transmitting the light reflected by the first reflector. Here, the adjuster is configured of two or more optical elements for adjusting the light emitted from the condenser according to a size of the image display surface, and one of the optical elements configuring the adjuster is also used as the first reflector.

Here, in the embodiments of the second invention, it is preferable that the adjuster is configured of a lens member of which an emission surface is formed in a concave surface, and an aspherical mirror that reflects the light emitted from the lens member toward the display.

According to the embodiments of the invention, it is possible to alleviate a linear layout of respective elements from the display to the light source by reflecting the light by the first reflector in an optical path before transmitting the image display surface forming the display image. Thus, it is possible to make the backlight device and the HUD device compact in size.

DETAILED DESCRIPTION OF THE EXEMPLARY EMBODIMENTS

First Embodiment

Figure 1:
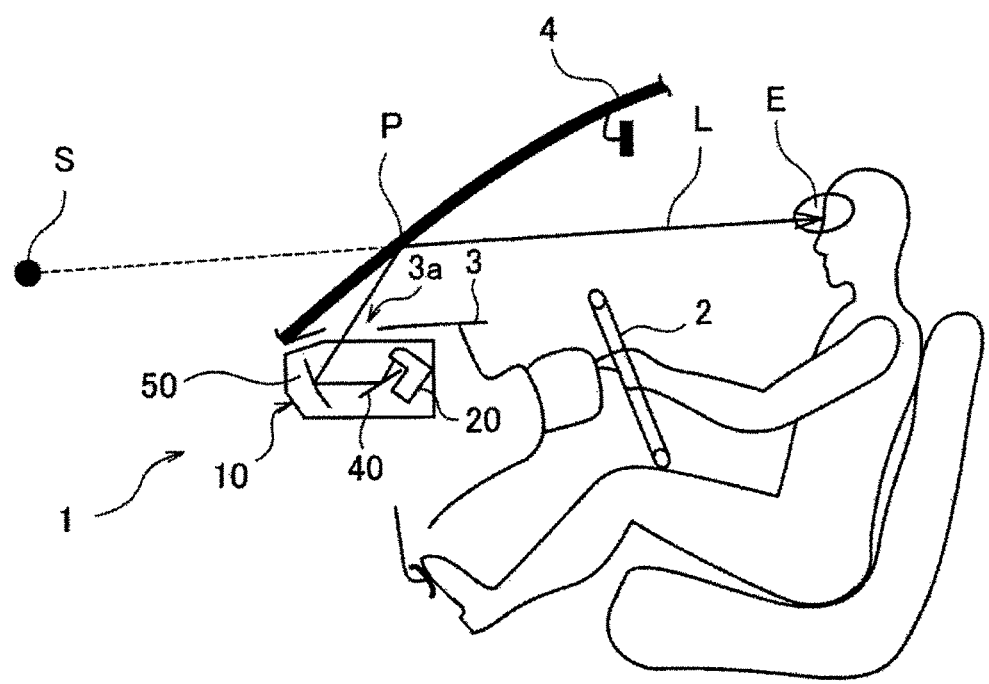
FIG. 1 is an explanatory view schematically illustrating a state of a vehicle to which an HUD device according to a first embodiment is applied.

FIG. 1 is an explanatory view schematically illustrating a state of a vehicle to which a head-up display device (HUD device) 1 according to the embodiment is applied. In an interior of the vehicle, when viewed from the driver, a steering wheel 2 is disposed in front of a driver and an instrument panel 3 is disposed in further front of the steering wheel 2. Then, a windshield 4 through which the scenery in front of the vehicle is transmitted is disposed in front of the instrument panel 3.

The instrument panel 3 is a member for partitioning a vehicle compartment space in front of the vehicle and is formed in a desired shape. An opening 3a passing through an inside and an outside of the instrument panel 3 is provided in a predetermined position of the instrument panel 3 and a predetermined region P of the windshield 4 is positioned above the opening 3a.

The HUD device 1 is mounted on the vehicle and the HUD device 1 is disposed within the instrument panel 3. The HUD device 1 is a device by which a predetermined display image is visually recognized by an occupant by a distant view with a virtual image. Display light L applied from the HUD device 1 is projected onto the windshield 4 through the opening 3a. The display light L is reflected by the windshield 4 and reaches an eye point E of a driver. Thus, the driver visually recognizes a virtual image S on an outside of the windshield 4. That is, the driver can simultaneously visually recognize an image (display image) of the light applied from the HUD device 1 and the scenery in front of the vehicle seen through the windshield 4 in an overlapped state.

Figure 2:
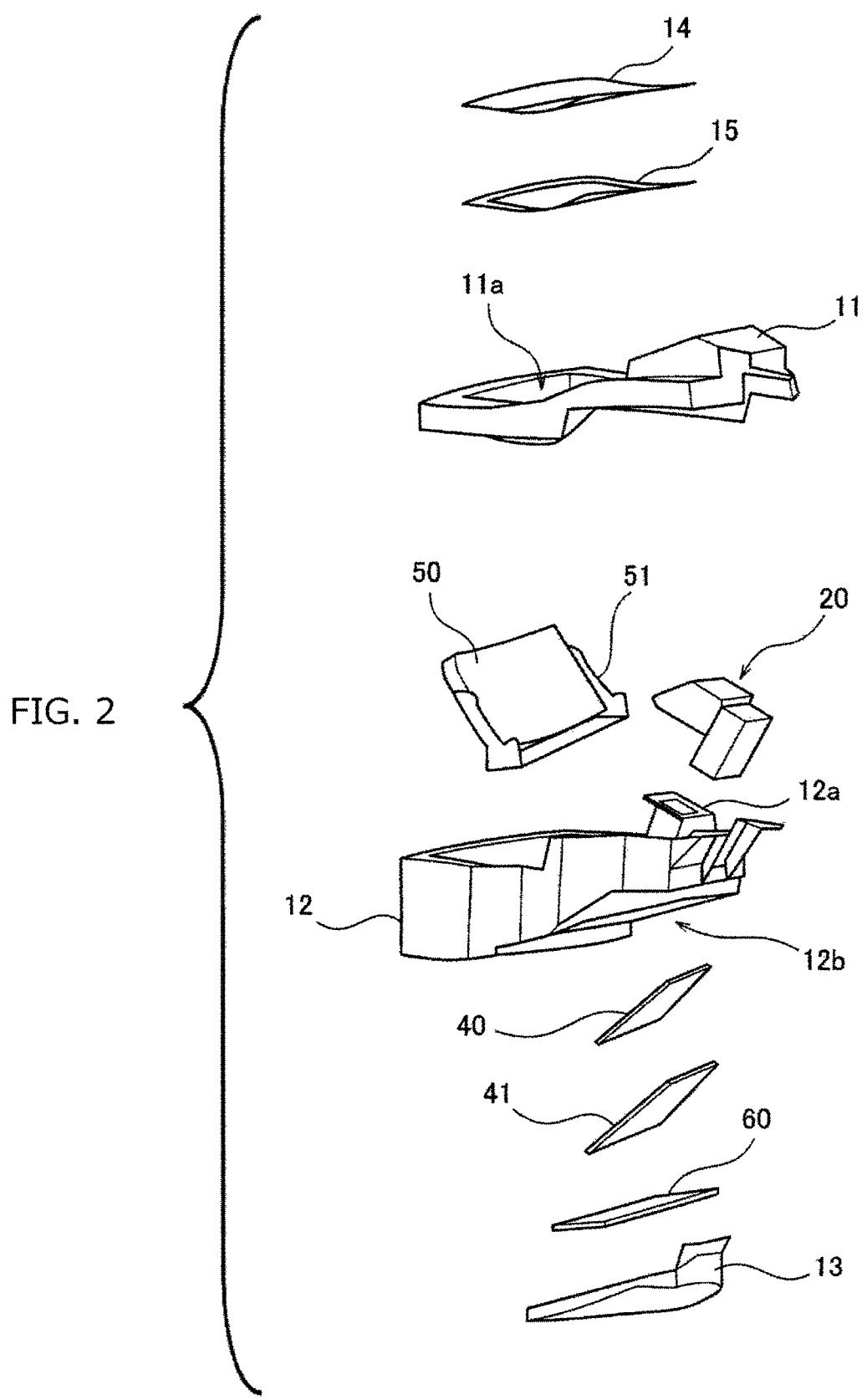
FIG. 2 is an exploded perspective view schematically illustrating a configuration of the HUD device.

The HUD device 1 is mainly configured of a case body 10, a backlight device 20, a fold mirror 40, and an aspherical mirror 50. Here, FIG. 2 is an exploded perspective view schematically illustrating a configuration of the HUD device 1.

The case body 10 is a case which accommodates the backlight device 20, the fold mirror 40, and the aspherical mirror 50, in an inside thereof, and protects these members. The case body 10 is configured of an upper case 11, a lower case 12, and a rear cover 13, and these members are integrated by respectively assembling the lower case 12 in a lower side of the upper case 11 and the rear cover 13 in a lower portion of the lower case 12. Assembling of the upper case 11 and the lower case 12, and assembling of the lower case 12 and the rear cover 13 are performed, for example, by screwing.

The upper case 11 configures an upper portion of the case body 10 and is formed in a desired shape. The upper case 11 includes an opening 11a for irradiating the windshield 4 with the display light L. For example, the opening 11a is formed in a substantially rectangular shape. A top plate 14 covering the opening 11a is disposed in the upper portion of the upper case 11 to capture glare and suppress entering of dust and the like into the inside of the case body 10. The top plate 14 is configured of a glass plate, a plastic plate, or another plate of a transparent material. The top plate 14 has a shape having a size greater than that of the opening 11a and is fixed to the upper case 11 by for example, an adhesive member 15 such as a double-sided tape.

The lower case 12 is a box having a bottom and including a certain accommodation space, an upper portion of the box is opened and the lower case 12 is formed in a desired shape. The lower case 12 includes a backlight pedestal 12a for supporting the backlight device 20 at a predetermined position. The backlight device 20 is assembled in the backlight pedestal 12a by screwing. Furthermore, the lower case 12 includes a mirror pedestal (not illustrated) for supporting a mirror holder 51 for holding an outer peripheral surface of the aspherical mirror 50. The mirror holder 51 is assembled in the mirror pedestal.

Here, the mirror holder 51 for holding the aspheric mirror 50 is assembled to be rotatable with respect to the mirror pedestal (not illustrated) of the lower case 12 and can change the inclination of the aspherical mirror 50. The mirror holder 51 is connected to a motor (not illustrated) through a power mechanism (not illustrated) and it is possible to adjust the inclination of the aspherical mirror 50 by a driving force of the motor. It is possible to adjust a projection position of the display light L in the windshield 4 by the inclination adjustment.

Furthermore, an opening 12b passing through the inside and the outside of the lower case 12 is formed at a part of the bottom surface of the lower case 12. A mirror bezel section 41 is attached to the fold mirror 40 so as to overlap a back surface side thereof and the fold mirror 40 is disposed at a desired position within the lower case 12 by assembling the mirror bezel section 41 in the opening 12b from the outside to the inside thereof.

The rear cover 13 is a cover that is disposed on a bottom surface side of the lower case 12 and covers the opening 12b. A main printed substrate 60 for controlling a display panel 27, the motor of the mirror holder 51, and an LED printed substrate 22 described below is disposed between the rear cover 13 and the mirror bezel section 41.

Figure 3:
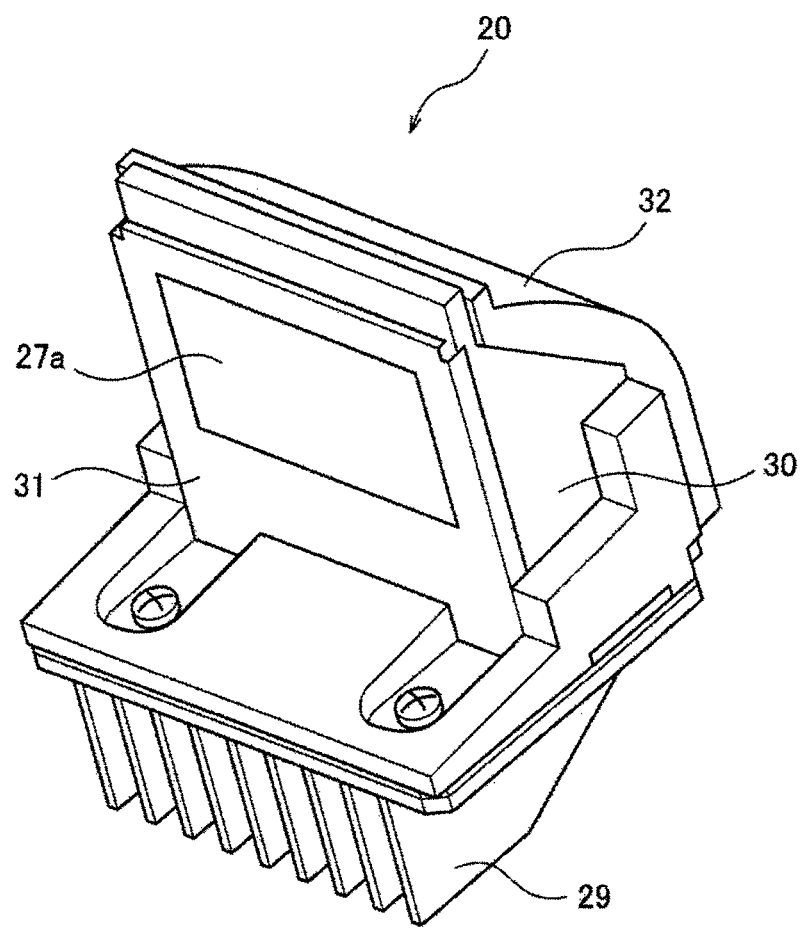
FIG. 3 is a perspective view schematically illustrating an appearance of a backlight device.
Figure 4:
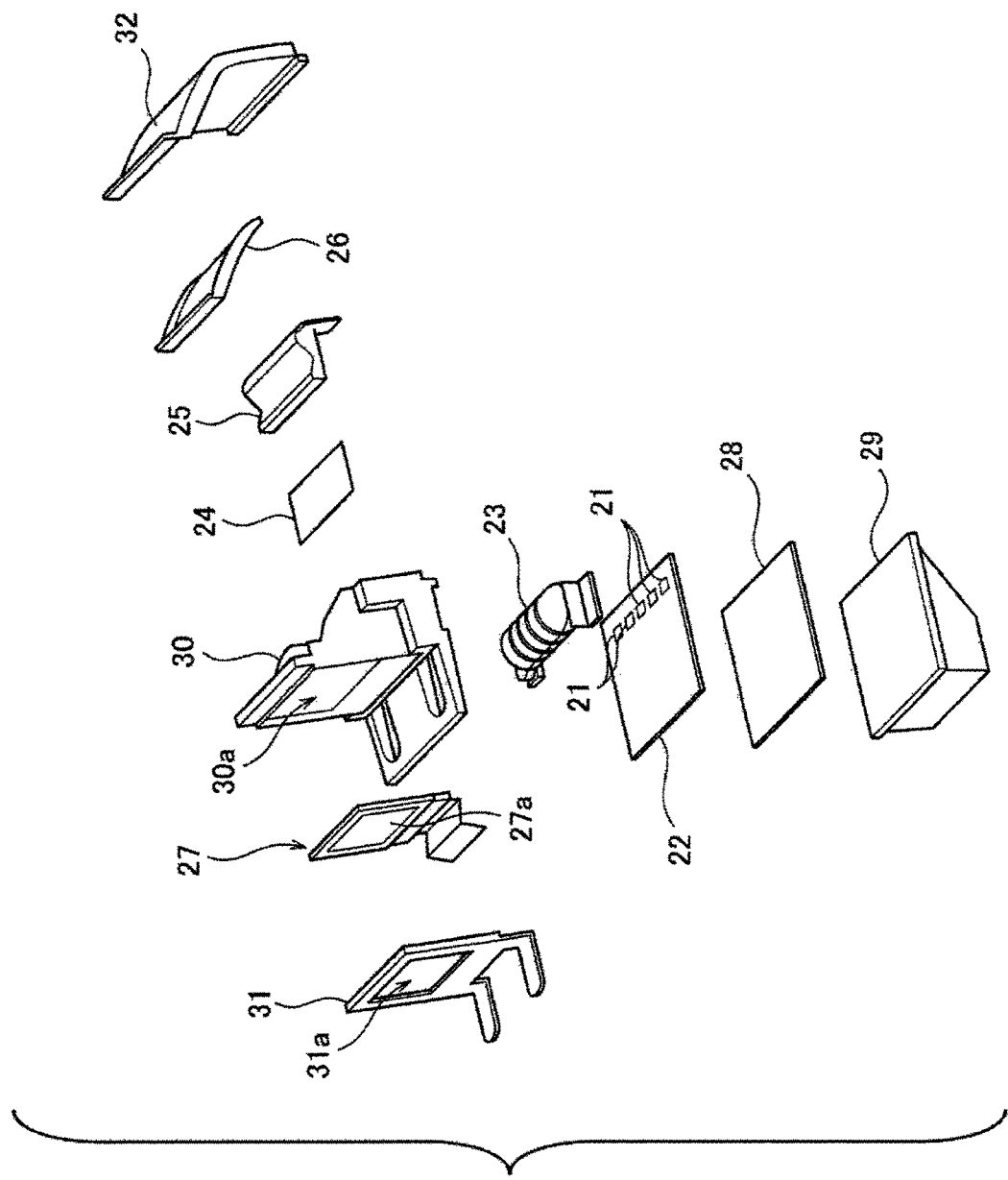
FIG. 4 is an exploded perspective view illustrating a configuration of the backlight device.
Figure 5:
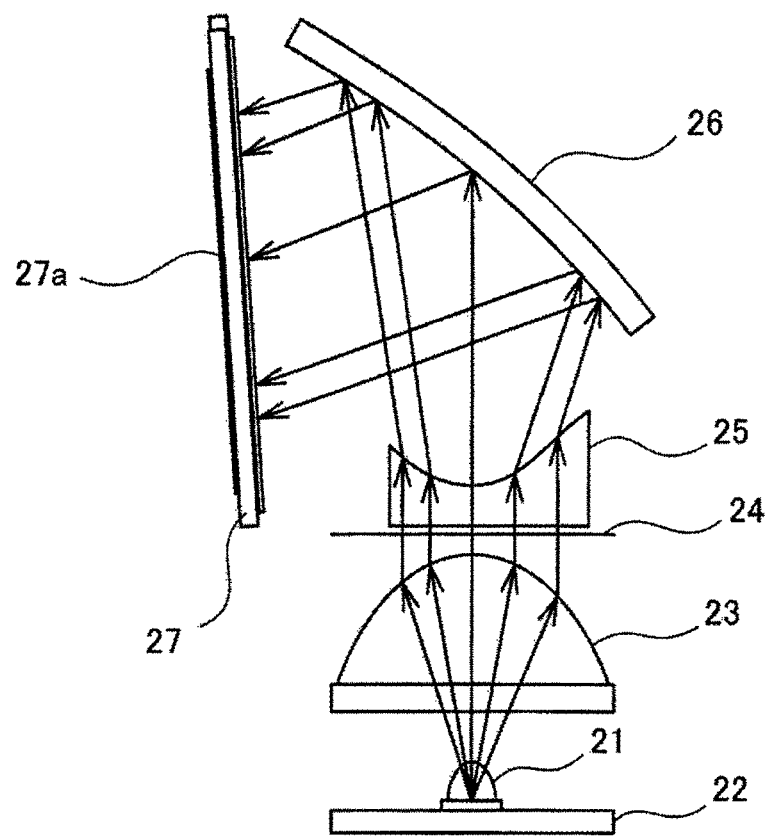
FIG. 5 is an explanatory view schematically illustrating a main configuration of an optical system configuring the backlight device according to the first embodiment.

FIG. 3 is a perspective view schematically illustrating an appearance of the backlight device 20 and FIG. 4 is an exploded perspective view illustrating a configuration of the backlight device 20. Furthermore, FIG. 5 is an explanatory view schematically illustrating a main configuration of an optical system configuring the backlight device 20. The backlight device 20 is a device emitting the display light L representing the display image and is mainly configured of LEDs 21, a lens array 23, a diffusion plate 24, a diffusion lens 25, an aspherical mirror 26, a display panel 27, and a backlight housing 30.

The LEDs 21 are mounted on the LED printed substrate 22 and the lens array 23 is disposed on the LED printed substrate 22 corresponding to a mounting position of the LEDs 21. A heat transfer sheet 28 and a heat sink 29 described below are laminated on a rear surface side in the LED printed substrate 22. The laminated structure thereof is assembled in the backlight housing 30 formed in a desired shape from the bottom surface side.

Furthermore, the diffusion plate 24, the diffusion lens 25, and the aspherical mirror 26 are disposed on the inside of the backlight housing 30 from an opening region formed on a rear surface side of the backlight housing 30, and are respectively assembled in each desired position in a relationship to satisfy optical requirements to be described. A mirror cover 32 is assembled in the opening region on the rear surface side of the backlight housing 30 and thereby the opening region is closed.

The display panel 27 is clamped by a shield plate 31 including an opening 31a corresponding to an image display surface 27a of the display panel 27 to be assembled on a front surface side (emission side of the display light) of the backlight housing 30. An opening 30a having a certain size corresponding to the image display surface 27a of the display panel 27 is formed on the front surface side of the backlight housing 30.

The LEDs 21 configures a light source emitting the light and are mounted on the LED printed substrate 22. In the embodiment, the light source is configured of a plurality of (for example, five) LEDs 21. The LEDs 21 are arranged linearly and at equal intervals. Here, as illustrated in FIG. 4, the plurality of the LEDs 21 are arranged at positions biased toward an edge side in a substrate region of the LED printed substrate 22. Thus, in the LED printed substrate 22, a large area is secured in a region in which the LEDs 21 are not mounted and if the LED printed substrate 22 is configured in the HUD device 1, the region is accommodated below the fold mirror 40 described below.

Furthermore, the backlight device 20 further includes the heat transfer sheet 28 and the heat sink 29. The heat sink 29 radiating heat generated in the LEDs 21 and the substrate thermally contacts a rear surface of the LED printed substrate 22, that is, a surface opposite to a mounting surface of the LEDs 21. For example, the heat sink 29 is configured by arranging a plurality of plate-shaped fins parallel to each other. Furthermore, in order to increase thermal contact efficiency between the LED printed substrate 22 and the heat sink 29, the heat transfer sheet 28 is provided between the LED printed substrate 22 and the heat sink 29.

The lens array 23 is formed of a translucent resin such as polycarbonate, for example, and is configured by arranging a plurality of lenses parallel to each other. In each lens, an incident surface is formed planar, an emission surface is formed as a convex surface, and the light emitted from the LED 21 is condensed in an optical axis direction (first direction) of the lens, and is emitted to the diffusion plate 24.

The diffusion plate 24 is, for example, formed of translucent resin such as polycarbonate and is, for example, formed in a rectangular plate shape having a plate thickness of approximately 0.1 mm. The diffusion plate 24 is disposed between the lens array 23 and the diffusion lens 25 in a state of being substantially parallel to the LED printed substrate 22. The diffusion plate 24 diffuses the light emitting from the lens array 23 and emits the diffused light to the diffusion lens 25. Boundaries of each LED 21 and boundaries between each lens configuring the lens array 23 are blurred, and non-uniformity of the intensity of the light is suppressed by a diffusion function of the diffusion plate 24.

The diffusion lens 25 is, for example, formed of translucent resin such as polycarbonate and is formed in a horizontally elongated shape in the arrangement direction of the LEDs 21. The diffusion lens 25 is disposed between the diffusion plate 24 and the aspherical mirror 26. The diffusion lens 25 has a uniform shape along the arrangement direction of the LEDs 21, an incident surface is formed in a plane, and an emission surface is formed in a concave surface. The diffusion lens 25 expands the light emitted from the lens array 23 through the diffusion plate 24 in order to obtain the size of the image display surface 27a of the display panel 27 and emits the light to the aspherical mirror 26.

The aspherical mirror 26 forms a reflective surface by depositing a metal film such as aluminum on a resin substrate and the reflective surface is formed in the aspherical surface. The aspherical mirror 26 is disposed in a state of being inclined at a certain angle on an optical path of the light emitted from the diffusion lens 25 and reflects the light emitted from the diffusion lens 25 toward the display panel 27. That is, the aspherical mirror 26 reflects the light emitted from the diffusion lens 25 in a direction (second direction) different therefrom. The embodiment is configured such that the optical path from the LED 21 to the display panel 27 forms a substantially L shape.

The aspherical mirror 26 emits the light that is expanded by the diffusion lens 25 with a size of the light fitted to the size of the image display surface 27a of the display panel 27. Furthermore, the aspherical mirror 26 uniformizes the light incident on the display panel 27 through the reflective action of the aspherical mirror 26. The light emitted from the diffusion lens 25 is emitted by the aspherical mirror 26 as light that is further uniformized than the incident light.

The display panel 27 is a display including the image display surface 27a configured of an LCD and the like, and forms a display image on the image display surface 27a. The display panel 27 is disposed on the optical path between the aspherical mirror 26 and the fold mirror 40. The display panel 27 transmits the light reflected by the aspherical mirror 26 from the rear surface side to the image display surface 27a and forms the display light L (see FIG. 1) representing the display image. The formed display light L is emitted to the fold mirror 40. The display image formed on the image display surface 27a includes information (letters, pictures, and the like) displayed for the occupant and is controlled by the main printed substrate 60 based on a display image signal input from a host controller.

The backlight housing 30 is disposed on the LED printed substrate 22 so as to cover the LEDs 21 and the lens array 23, and the diffusion plate 24, the diffusion lens 25, and the aspherical mirror 26 are respectively assembled in desired positions. Furthermore, the display panel 27 is assembled in the opening 30a of the backlight housing 30, and the light from the LEDs 21 is incident on the display panel 27 with being guided through the inside of the backlight housing 30 by the lens array 23, the diffusion plate 24, the diffusion lens 25, and the aspherical mirror 26.

Figure 6:
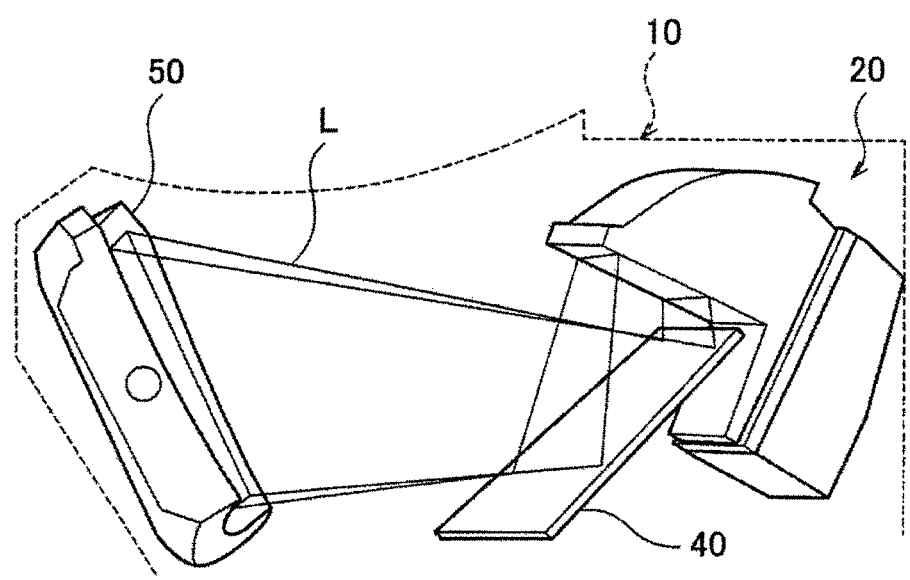
FIG. 6 is an explanatory view illustrating a relationship between the backlight device, a fold mirror, and an aspherical mirror.

FIG. 6 is an explanatory view illustrating a relationship between the backlight device 20, the fold mirror 40, and the aspherical mirror 50. The fold mirror 40 forms a reflective surface by depositing a metal film such as aluminum on a resin substrate and the reflective surface is formed planar. The fold mirror 40 is disposed on the optical path of the display light L emitted from the backlight device 20 in a state of being inclined at a certain angle and reflects the display light L emitted from the backlight device 20 toward the aspherical mirror 50. In the embodiment, the backlight device 20 downwardly emits the display light L from above and the display light L is incident from above to the fold mirror 40. The fold mirror 40 guides the incident display light L to the aspherical mirror 50 by reflecting the display light L in a substantially horizontal direction.

The aspherical mirror 50 forms a reflective surface by depositing a metal film such as aluminum on a resin substrate and the reflective surface is formed in the aspherical surface. The aspherical mirror 50 is disposed on the optical path of the display light L emitted from the fold mirror 40 in a state of being inclined at a certain angle and reflects the display light L emitted from the fold mirror 40 toward the windshield 4. In the embodiment, the display light L is incident on the aspherical mirror 50 in the horizontal direction, the aspherical mirror 50 reflects the incident display light L toward the windshield 4 side (substantially upward), and the display light L is guided to the windshield 4. The aspherical mirror 50 also has a function of expanding the display light L form the fold mirror 40 to a desired size.

The backlight device 20 according to the embodiment includes a plurality of LEDs 21 (light source) emitting the light, the lens array 23 (condenser) for condensing the light emitted from the plurality of LEDs 21 in the first direction, the adjuster for adjusting the light emitted from the lens array 23, the first reflector for reflecting the light emitted from the adjuster in the second direction different from the first direction, and the display panel 27 (display) for emitting the display light L representing the display image by allowing the light reflected by the first reflector to be transmitted to the image display surface 27a. Then, the adjuster is configured of two or more optical elements for adjusting light emitted from the lens array 23 according to the size of the image display surface 27a One of the optical elements configuring the adjuster is also used as the first reflector.

It is possible to alleviate a linear layout of respective elements from the display panel 27 to the LEDs 21 by folding the optical path within the backlight device 20 by the first reflector. Furthermore, since one of the optical elements configuring the adjuster is also used as the first reflector, it is not necessary to provide a dedicated optical element as the first reflector and it is also possible to make the configuration from the LEDs 21 to the first reflector compact. Thus, it is possible to make the backlight device 20 compact and it is also possible to make the HUD device 1 including the backlight device 20 compact. Thus, it is possible to suppress interference with the instrument panel 3 or other vehicle components mounted on the vehicle compartment. In addition, since the HUD device 1 can be disposed in a compact accommodation space, it is possible to broaden the type of the vehicle on which the HUD device 1 can be mounted.

The HUD device 1 according to the embodiment includes the plurality of LEDs 21 (light source) for emitting the light, the lens array 23 (condenser) for condensing the light emitted from the plurality of LEDs 21 in the first direction, the adjuster for adjusting the light emitted from the lens array 23, the first reflector for reflecting the light emitted from the adjuster in the second direction different from the first direction, the display panel 27 (display) for emitting the display light L by allowing the light reflected by the first reflector to be transmitted to the image display surface 27a, the fold mirror 40 (second reflector) for reflecting the incident display light by allowing the display light L emitted from the display panel 27 to be incident from above, and the aspherical mirror 50 (third reflector) for reflecting the display light incident from the fold mirror 40 toward the windshield 4 (projection member). Here, the adjuster adjusts the light emitted from the lens array 23 according to the size of the image display surface 27a.

As described above, since the HUD device 1 is covered by the instrument panel 3, it is necessary to accommodate the HUD device 1 in a limited space and certain restrictions are imposed on the size thereof. The HUD device 1 of the embodiment is configured such that the display light L is emitted toward the fold mirror 40 that is positioned in the lower portion. Thus, if the layout of respective elements from the LEDs 21 to the display panel 27 is linearly provided, since respective elements from the display panel 27 to the LEDs 21 are upwardly arranged from below, the size of the device upwardly increases.

Furthermore, in the HUD device 1, layout requirements of the display panel 27 are determined depending on a design distance to the virtual image S that is visually recognized by the driver and an arrangement position of the HUD device 1 is determined depending on the layout requirements. In this case, the HUD device 1 is likely to be disposed in the vicinity of the instrument panel 3, the size of the device may upwardly increase, and then interference with the instrument panel 3 may be caused and a large accommodating space may be necessary. Thus, there may be a problem that the type of the vehicle on which the HUD device 1 can be mounted is limited.

In this respect, in the HUD device 1 according to the embodiment, the optical path from the LEDs 21 to the display panel 27 is configured to be folded by the first reflector from the first direction to the second direction. It is possible to alleviate the linear layout of respective elements from the display panel 27 to the LEDs 21 by folding the optical path by the first reflector. Thus, it is possible to make the size of the HUD device 1 compact in an upward direction. As a result, since interference with the instrument panel 3 is not caused and a large accommodating space is not necessary, it is possible to solve the problem that the type of the vehicle on which the HUD device 1 can be mounted is limited.

Furthermore, in the embodiment, the adjuster further includes a function of uniformizing the intensity distribution of the light incident on the image display surface 27a.

According to the configuration, it is possible to suppress the occurrence of unevenness in the intensity distribution of the light incident on the image display surface 27a. Thus, it is possible to allow the light of the uniform intensity distribution to be incident on the image display surface 27a. As a result, it is possible to suppress light shading of the light appearing in the virtual image S and it is possible to improve visibility.

Furthermore, in the embodiment, the adjuster is configured of two or more optical elements and one of the optical elements configuring the adjuster is also used as the first reflector.

In the configuration, since the adjuster is also used as the first reflector, it is not necessary to provide a dedicated optical element as the adjuster. Thus, it is possible to make the configuration, from the LEDs 21 to the first reflector, compact. Thus, it is possible to make an entire device compact.

Here, in the HUD device 1 and the backlight device 20 of the embodiment, the adjuster is configured of the diffusion lens 25 that is a lens member of which the emission surface is formed as the concave surface and the aspherical mirror 26 that reflects the light emitted from the diffusion lens 25 to the display panel 27.

In the configuration, the light emitted from the diffusion lens 25 is reflected on the aspherical mirror 26 and thereby it is possible to uniformize the intensity distribution of the light incident on the image display surface 27a. Thus, it is possible to suppress the occurrence of unevenness in the intensity distribution of the light incident on the image display surface 27a. Thus, it is possible to allow the light of the uniform intensity distribution to be incident on the image display surface 27a. Thus, it is possible to suppress light shading of the light appearing in the virtual image S and it is possible to improve visibility.

Furthermore, since the aspherical mirror 26 also includes the function of the adjuster, the diffusion lens 25 can be realized as the lens of which the emission surface is the concave surface. Thus, since a thickness of the diffusion lens 25 in the optical axis direction can be thinned, it is possible to make the entire device compact.

Furthermore, in the embodiment, the HUD device 1 and the backlight device 20 further have the LED printed substrate 22 on which the plurality of LEDs 21 are mounted, the heat sink 29 (heat radiating member) that thermally contacts the LED printed substrate 22, and the backlight housing (housing) 30 in which the display panel 27 disposed on the LED printed substrate 22 is assembled and which is provided so as to cover the plurality of LEDs 21. Here, the LED printed substrate 22 and the heat sink 29 extend in the emission direction of the display light LED and are accommodated in the lower portion of the fold mirror 40.

In the HUD device 1, since the light emitted from the LEDs 21 reaches the eye point of the occupant through the plurality of optical elements, the intensity of the light is attenuated in the process. Furthermore, in recent years, there is tendency that the display panel 27 is also colored and the attenuation of the light by the display panel 27 becomes large. Thus, high output of the light source is attempted, and, due to increasing of the number of mounted LEDs 21 and increasing of the output of the LEDs 21, an amount of heat generated by the LEDs 21 is also increased. Thus, there is a tendency that a size of the heat sink 29 is also increased and since the heat sink 29 is laid out on a rear surface of the LED printed substrate 22, there is a tendency that a size of the backlight device 20 including the backlight housing 30 is increased in an upward direction.

In this respect, it is possible to alleviate the linear layout of respective elements from the display panel 27 to the LEDs 21 by folding the optical path within the backlight device 20 by the aspherical mirror 26. That is, since respective elements from the diffusion lens 25 to the heat sink 29 do not extend in the upward direction, it is possible to make the backlight device 20 and the HUD device 1 compact in the upward direction. Thus, since interference with the instrument panel 3 is not caused and a large accommodating space is not necessary, it is possible to solve the problem that the type of the vehicle on which the HUD device 1 can be mounted is limited.

Furthermore, in the embodiment, since the LED printed substrate 22 and the heat sink 29 extend in the emission direction of the display light LED, it is possible to secure a large radiating area. If the radiating area is secured, the sizes of the LED printed substrate 22 and the heat sink 29 may be increased. In this regard, the entire backlight device 20 is configured in a substantially L shape by extending the LED printed substrate 22 and the heat sink 29 in the emission direction of the display light LED. By the substantially L shape, it is possible to accommodate extending portions of the LED printed substrate 22 and the heat sink 29 with a space present in the lower portion of the fold mirror 40 effectively utilized. Thus, it is possible to suppress an increase in size of the backlight device 20 in the upward direction while securing heat radiation efficiency.

Second Embodiment

Figure 7:
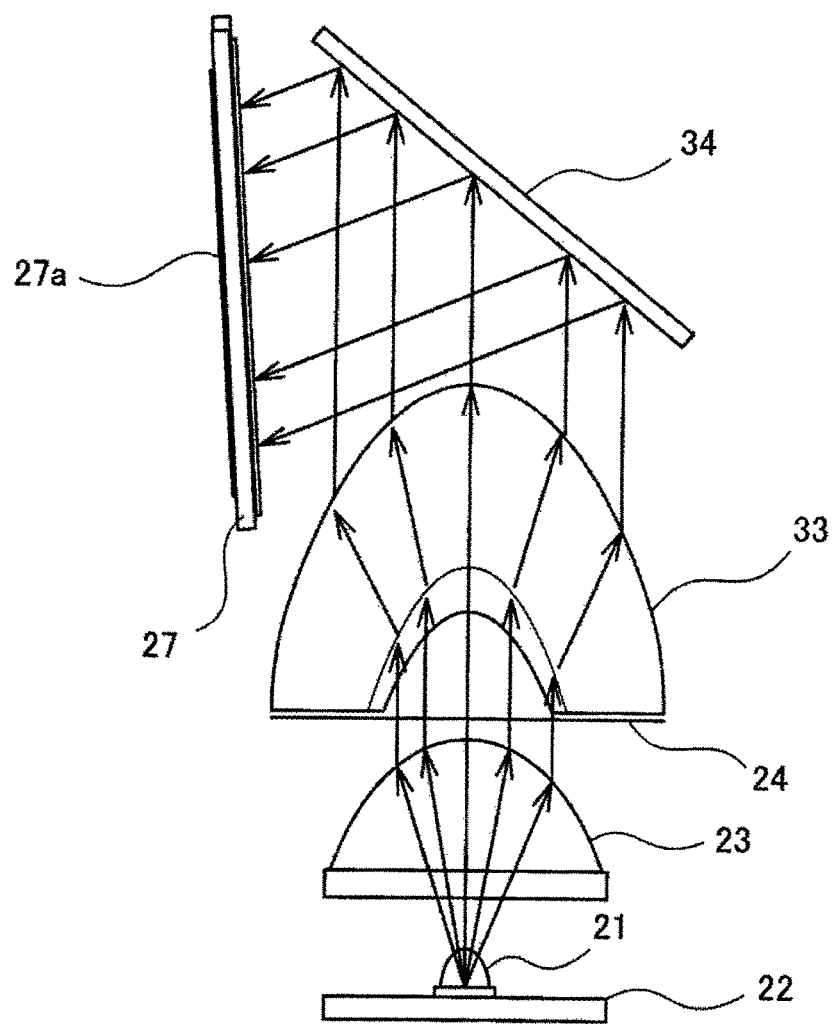
FIG. 7 is an explanatory view schematically illustrating a main configuration of an optical system configuring a backlight device according to a second embodiment.

FIG. 7 is an explanatory view schematically illustrating a main configuration of an optical system configuring a backlight device 20 according to a second embodiment. In an HUD device 1 and the backlight device 20 according to the second embodiment, points different from the first embodiment are that a first reflector and an adjuster are respectively configured of separate optical elements. Hereinafter, the configuration that overlaps the first embodiment will be omitted and differences will be mainly described below.

In the embodiment, the backlight device 20 is a device applying a display light L representing a display image and is mainly configured of LEDs 21, a lens array 23, a diffusion plate 24, a diffusion lens 33, a plane mirror 34, and a display panel 27.

The diffusion lens 33 is, for example, formed of translucent resin such as polycarbonate and is formed in a horizontally elongated shape in an arrangement direction of the LEDs 21. The diffusion lens 33 is disposed between the diffusion plate 24 and the plane mirror 34. The diffusion lens 33 has a uniform shape along the arrangement direction of the LEDs 21, an incident surface is formed in a concave surface, and an emission surface is formed in a convex surface. The diffusion lens 33 expands light emitted from a lens array 23 through the diffusion plate 24 on the incident surface, and emits the light expanded by the incident surface with a size of the light fitted to a size of an image display surface 27a of the display panel 27 on the emission surface.

Furthermore, the diffusion lens 33 also includes a function of uniformizing the light incident on the display panel 27. That is, the light emitted from the lens array 23 is emitted to the plane mirror 34 by the diffusion lens 33 as light that is further uniformized than the incident light.

The plane mirror 34 forms a reflective surface by depositing a metal film such as aluminum on a resin substrate and the reflective surface is formed in a plane. The plane mirror 34 is disposed on an optical path of the light emitted from the diffusion lens 33 in a state of being inclined at a certain angle and reflects the light emitted from the diffusion lens 33 toward the display panel 27. That is, the plane mirror 34 reflects the light emitted from the diffusion lens 25 in a direction (second direction) different therefrom. Similar to the first embodiment, the optical path from the LEDs 21 to the display panel 27 is configured to be a substantially L shape.

In such an embodiment described above, it is possible to alleviate a linear layout of each element from the display panel 27 to the LEDs 21 by folding the optical path within the backlight device 20 by the plane mirror 34. That is, since elements from the diffusion lens 33 to the LEDs 21 do not extend in the upward direction, it is possible to make the backlight device 20 and the HUD device 1 compact in the upward direction. Thus, since interference with the instrument panel 3 is not caused and a large accommodating space is not necessary, it is possible to solve the problem that the type of the vehicle on which the HUD device 1 can be mounted is limited.

Above, the HUD devices according to the embodiments of the invention are described, but the invention is not limited to the embodiments described above, and it is needless to say that various modifications can be provided within the scope of the invention. Furthermore, in addition to the HUD device, the backlight device configuring the HUD device also functions as a part of the invention.

Furthermore, in the embodiments described above, the display light is projected from the backlight device 20 to the windshield 4, but may be projected to another projection member other than the windshield 4, and for example, it is possible to use a combiner. Furthermore, in a half mirror structure for performing virtual image display on a transparent cover covering the front of a meter device, the transparent cover member may be used as the projection member.

What is claimed is:

1. A head-up display device in which display light representing a display image is projected to a projection member so that an occupant visually recognizes the display image, the head-up display device comprising:
    a light source that emits light;
    a printed substrate on which the light source is mounted,
    a condenser that condenses the light emitted from the light source in a first direction;

an adjuster that adjusts the light emitted from the condenser;
a first reflector that reflects the light emitted from the adjuster in a second direction different from the first direction;
a display that includes an image display surface forming the display image and emits the display light with the image display surface transmitting the light reflected by the first reflector;
a second reflector that reflects the display light being emitted from the display, the display being positioned above the second reflector; and
a third reflector that reflects the display light incident from the second reflector to the projection member,
wherein the adjuster is configured of two or more optical elements for adjusting the light emitted from the condenser according to a size of the image display surface,
wherein one of the optical elements being a diffusion lens disposed between the condenser and the first reflector, and
wherein the display and the printed substrate are configured to receive a portion of the second reflector between the display and the printed substrate.

2. The head-up display device according to claim 1, wherein the adjuster uniformizes intensity distribution of the light incident on the image display surface.

3. The head-up display device according to claim 1, wherein the adjuster is configured of two or more optical elements, and
wherein one of the optical elements configuring the adjuster is also used as the first reflector.

4. The head-up display device according to claim 1, further comprising:
a heat radiating member that thermally contacts the printed substrate; and
a housing which is disposed on the printed substrate so as to cover the light source and in which the display is assembled,
wherein a portion of the printed substrate and a portion of the heat radiating member extend in an emission direction of the display light so that the portions are disposed away from the housing and the extended portions of the printed substrate and the heat radiating member are accommodated below the second reflector.

5. A backlight device comprising:
a light source that emits light;
a printed substrate on which the light source is mounted,
a condenser that condenses the light emitted from the light source in a first direction;
an adjuster that adjusts the light emitted from the condenser according to a size of an image display surface;
a first reflector that reflects the light emitted from the adjuster in a second direction different from the first direction; and
a display that includes an image display surface forming a display image and emits display light representing the display image with the image display surface transmitting the light reflected by the first reflector,
wherein the adjuster is configured of two or more optical elements for adjusting the light emitted from the condenser,
wherein one of the optical elements being a diffusion lens of which an emission surface is formed in a concave surface, the diffusion lens being disposed between the condenser and the first reflector,
wherein another of the optical elements configuring the adjuster is also used as the first reflector, and
wherein the display and the printed substrate are configured to receive a portion of a second reflector, which reflects the display light being emitted from the display, between the display and the printed substrate.

6. The backlight device according to claim 5, wherein the first reflector comprises an aspherical mirror that reflects the light emitted from the diffusion lens toward the display.

7. The head-up display device according to claim 1, wherein the diffusion lens includes an emission surface formed in a concave surface, and the first reflector comprises an aspherical mirror that reflects the light emitted from the diffusion lens toward the display.

8. The head-up display device according to claim 1, wherein the second reflector comprises a fold mirror.

9. The backlight device according to claim 5, the backlight device further comprising:
a heat radiating member that thermally contacts the printed substrate; and
a housing which is disposed on the printed substrate so as to cover the light source and in which the display is assembled,
wherein a portion of the printed substrate and a portion of the heat radiating member extend in an emission direction of the display light so that the portions are disposed away from the housing and the extended portions of the printer substrate and the heat radiating member are accommodated below the second reflector.

10. The head-up display device according to claim 4, wherein a portion of the heat radiating member extending towards the housing has a tapered shape.

11. The head-up display device according to claim 4, wherein the portion of the heat radiating member extending in the emission direction of the display light is larger than a portion of the heat radiating member extending towards the housing.

12. The head-up display device according to claim 1, wherein another of the optical elements is a diffusion plate between the condenser and the diffusion lens.

13. The head-up display device according to claim 1, wherein the first reflector reflects the light, emitted from the diffusion lens of the adjuster directly to the first reflector, in the second direction.

14. The backlight device according to claim 5, wherein the first reflector reflects the light emitted directly from the diffusion lens of the adjuster in the second direction.

* * * * *